US009240610B2

(12) United States Patent
Poulsen et al.

(10) Patent No.: US 9,240,610 B2
(45) Date of Patent: Jan. 19, 2016

(54) RECHARGEABLE BATTERY WITH REDUCED MAGNETIC LEAK

(75) Inventors: Jens Kristian Poulsen, Waterloo (CA);
Larry Edward Hawker, Waterloo (CA);
George Soliman Mankaruse, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1224 days.

(21) Appl. No.: 12/623,730

(22) Filed: Nov. 23, 2009

(65) Prior Publication Data

US 2011/0123843 A1    May 26, 2011

(51) Int. Cl.
*H01M 10/04* (2006.01)
(52) U.S. Cl.
CPC .................. *H01M 10/0431* (2013.01)
(58) Field of Classification Search
USPC .......................................................... 429/10
See application file for complete search history.

(56) References Cited

U.S. PATENT DOCUMENTS

| 5,460,904 | A |  | 10/1995 | Gozdz et al. |
| 6,307,151 | B1 | * | 10/2001 | Roberson ....................... 174/377 |
| 6,337,154 | B1 | * | 1/2002 | Jacobs et al. .................. 429/175 |
| 6,399,238 | B1 | * | 6/2002 | Oweis et al. ..................... 429/99 |
| 2003/0129479 | A1 | * | 7/2003 | Munenaga et al. .............. 429/94 |
| 2006/0088759 | A1 |  | 4/2006 | Roh |
| 2007/0269685 | A1 | * | 11/2007 | Chu et al. .......................... 429/3 |

FOREIGN PATENT DOCUMENTS

| CN | 1742403 A | 3/2006 |
| CN | 1294672 C | 1/2007 |
| JP | 62-104432 | 7/1987 |
| JP | 3-112868 | 5/1991 |
| JP | 2002-324568 | 11/2002 |
| JP | 2003-242956 A1 | 8/2003 |
| JP | 2004-165309 A1 | 6/2004 |
| JP | 2007-220372 | 8/2007 |
| JP | 2007220372 A | 8/2007 |
| JP | 2009-505366 | 2/2009 |
| JP | 2009-199825 A1 | 9/2009 |
| JP | 2009-537945 | 10/2009 |
| KR | 2000-0051741 | 8/2000 |
| KR | 2003-0066960 | 8/2003 |
| KR | 10-0496290 | 6/2005 |
| WO | WO 0159868 A1 | 8/2001 |
| WO | WO 0159870 A1 | 8/2001 |

(Continued)

OTHER PUBLICATIONS

EPO, Extended European Search Report regarding application No. 10171552.2 dated May 4, 2011.

(Continued)

*Primary Examiner* — Alix Eggerding
(74) *Attorney, Agent, or Firm* — Ridout & Maybee LLP (57) ABSTRACT

In use in a battery, a first spiral-wound battery element and associated wiring generates a first magnetic field and a second spiral-wound battery element and associated wiring generates a second magnetic field. The first element, the second element and the wiring may be arranged within a casing so that the first magnetic field is proximate to the second magnetic field and oriented in an opposite polarity. Conveniently, it may be shown that the total magnetic field generated by the battery has significantly lower magnitude than the total magnetic field generated by a conventional battery for the same current drain and same wiring structure.

14 Claims, 11 Drawing Sheets

(56) References Cited

FOREIGN PATENT DOCUMENTS

| WO | WO2007021083 A1 | 2/2007 |
| WO | WO2007132992 A1 | 11/2007 |
| WO | 2009015282 A1 | 1/2009 |

OTHER PUBLICATIONS

Extended European Search Report re: application No. 09176742.6, dated Mar. 17, 2010.
Office Action, Canadian patent application No. 2,710,724 dated Jul. 12, 2011.
Office Action, Japanese patent application No. 2010-165391 dated Oct. 26, 2012.
English Translation, Office Action Japanese patent application No. 2010-165391 dated Oct. 26, 2012.
Office Action, Japanese patent application No. 2010-165391 dated Jul. 26, 2013.
English Translation, Office Action Japanese patent application No. 2010-165391 dated Jul. 26, 2013.
Office Action, Korean patent application No. 10-2010-0071019 dated Apr. 23, 2012.
English Translation, Office Action Korean patent application No. 10-2010-0071019 dated Apr. 23, 2012.
English abstract of Japanese Publication No. 2007-220372 dated Aug. 30, 2007.
English abstract of Japanese Publication No. 2002-324568 dated Nov. 8, 2002.
English abstract of Korean Publication No. 1020030066960 A dated Aug. 14, 2003.
English abstract of Korean Publication No. 1020040054201 A dated Jun. 25, 2004.
English abstract of Korean Publication No. 1020000051741 A dated Aug. 16, 2000.
Office Action, Korean patent application No. 10-2010-0071019 dated Nov. 30, 2012.
English Translation, Korean patent application No. 10-2010-0071019 dated Nov. 30, 2012.
Final Rejection, Korean patent application No. 10-2010-0071019 dated May 29, 2013.
English Translation, Final Rejection, Korean patent application No. 10-2010-0071019 dated May 29, 2013.
First Office Action, Chinese patent application No. 201010237345.0 dated Jan. 28, 2013.
English Translation, First Office Action, Chinese patent application No. 201010237345.0 dated Jan. 28, 2013.
Second Office Action, Chinese patent application No. 201010237345.0 dated Jul. 24, 2013.
English Translation, Second Office Action, Chinese patent application No. 201010237345.0 dated Jul. 24, 2013.
Extended European Search Report re Application No. 10171552.2-1227 dated May 4, 2011.
Office Action, Canadian patent application No. 2,798,619 dated May 30, 2013.
Canadian Examiner's Report dated Jan. 28, 2014, Canadian Application No. 2,798,619.
Japan Patent Office, Official Action dated Jun. 15, 2015 in respect of Japanese Patent Application No. 2010-165391 and its English translation.

* cited by examiner

RECHARGEABLE BATTERY WITH REDUCED MAGNETIC LEAK

FIELD

The present application relates generally to rechargeable batteries and, more specifically, to a rechargeable battery with reduced magnetic leak.

BACKGROUND

In the mobile telephone standard known as Global System for Mobile communications (GSM), a time division multiple access (TDMA) is used for transmit and receive RF signals. Before the transmit time slot, the RF power amplifier is enabled and it stays on for approximately 588 us until the transmit operation is completed. This scenario repeats every approximately 4.6 ms, and the output signal is then called transmit burst. The operation of the power amplifier requires large DC current to be withdrawn from the battery. In some cases this current can exceed 2 amperes. This current will be switched on and off based on the same TDMA control signals which will cause pulses of large current at frequency of 217 Hz.

Unfortunately, an unintended result of the burst transmission system is a magnetic signal radiating from a mobile telephone employing the GSM standard. The electromagnetic signal has components centered at 217 Hz (fundamental frequency) and centered at frequencies that are multiples (harmonics) of 217 Hz. Other scenarios may likewise result in large current draws from a battery and consequent generation of electromagnetic signals, but the above scenario is a representative situation in which they may occur.

BRIEF DESCRIPTION OF THE DRAWINGS

Reference will now be made to the drawings, which show by way of example, embodiments of the present disclosure, and in which.

DETAILED DESCRIPTION OF THE EMBODIMENTS

It has been discovered through experimentation that the rechargeable battery pack is a major contributor to the generation and the emission of electromagnetic signals. Such electromagnetic signals generally do not convey useful information, and are generally regarded as noise in the electromagnetic spectrum.

In addition, the electromagnetic signal may manifest and be experienced as an annoying audible noise emanating from audio equipment in proximity to the mobile telephone, or from the mobile telephone itself. The electromagnetic signals can, for example, interfere with nearby magnetic fields that may be carrying useful information.

In one scenario, involving a mobile telephone communicating with a hearing instrument for the hearing impaired, an audio output signal in a mobile telephone is used to modulate current in a coil in the mobile telephone. The modulations produce magnetic field variations that vary proportionally with the audio output signal. The magnetic field variations may then be received by a hearing instrument for the hearing impaired (e.g., a hearing aid; as discussed below, the hearing instrument will be discussed in the context of a hearing aid).

However, the electromagnetic signal radiated from mobile telephones may be shown to cause interference with the magnetic field variations generated responsive to the audio output signal, resulting in audible distortion. In other words, a user of a hearing instrument (referred to herein as a hearing aid user) does not hear, with good fidelity, the audio output that conveys useful information.

Through a construction and a manner of manufacturing of a battery described herein, undesired magnetic field output may be significantly reduced. In particular, individual elements, each with their own magnetic field due to wiring and geometrical configuration, may be arranged in such a manner as to oppose and cancel each other's magnetic fields, leading to an overall magnetic field of reduced magnitude relative to existing battery designs.

The techniques described herein may realize one or more advantages, For example, the techniques may be more efficient and effective than, and less costly and inconvenient than, techniques that try to isolate the battery of the mobile telephone as one source of the interference, or that relocate the battery within the mobile telephone to a location relatively distant from a coil with in a hearing aid. It may, for various reasons, be desirable to locate the battery close to the magnetic output transmitting coil on the mobile phone. The techniques described herein may enable such location without significant interference from the battery, thereby improving the quality of the signal received by a hearing aid user.

Furthermore, the techniques described herein may improve the performance of other devices as well. There may be better sound and less noise from the mobile telephone and from other nearby audio equipment as well.

According to an embodiment, there is provided a battery. The battery includes a first rolled element, a second rolled element and a casing. The first element includes a first anode layer and a first cathode layer, the first element generating, in use, a first magnetic field. The second rolled element includes a second anode layer and a second cathode layer, the second element generating, in use, a second magnetic field. The first rolled element and the second rolled element are arranged within the casing so that the first magnetic field is proximate to the second magnetic field and oriented in an opposite polarity with a symmetry in the battery configuration.

According to another embodiment, there is provided a battery. The battery includes a folded element including an anode layer and a cathode layer and a casing containing the folded element, wherein the folded element comprises the anode layer and the cathode layer being folded to bring a first site in the anode layer proximate to a second site in the anode layer, and to bring a first site in the cathode layer proximate to a second site in the cathode layer.

Other aspects and features of the present invention will become apparent to those of ordinary skill in the art upon review of the following description of specific embodiments of the invention in conjunction with the accompanying figures.

Figure 1:
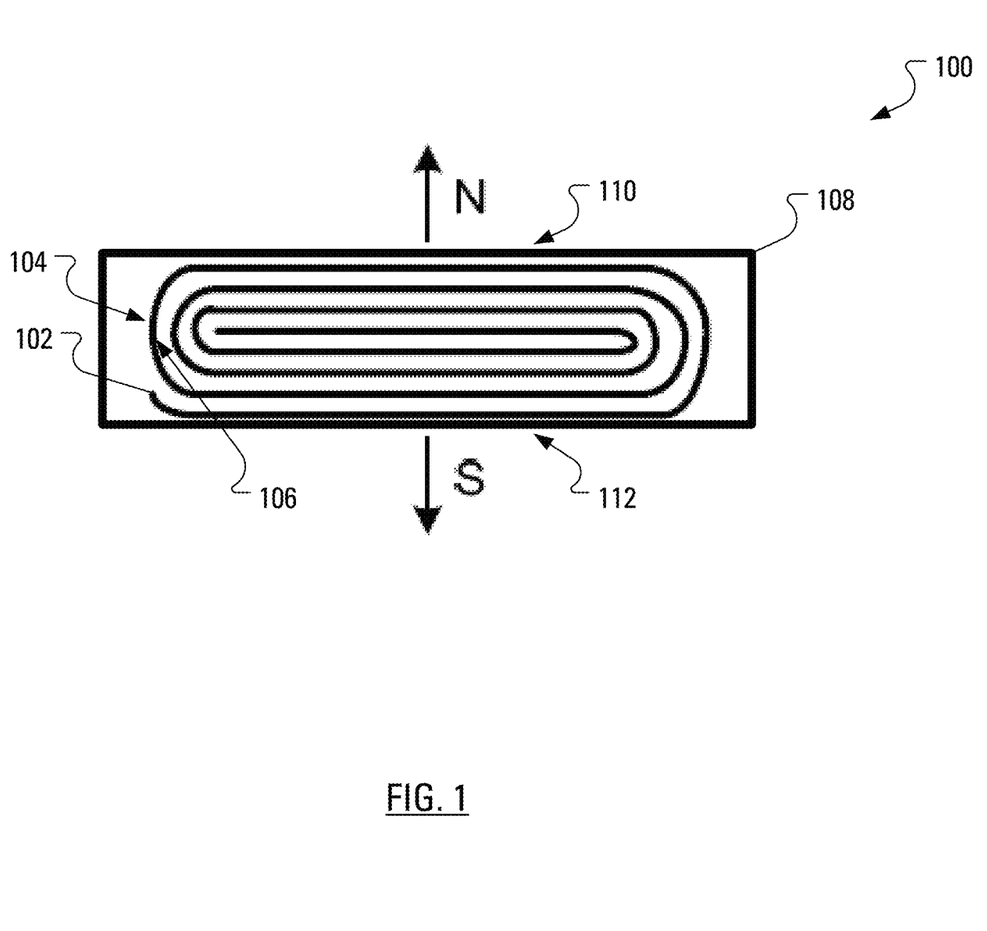
FIG. 1 illustrates a battery structure, in cross-section, using a single element.

FIG. 1 illustrates, in cross-section, a mobile telephone battery 100, which is normally produced by rolling one or more sheets of specially prepared flat layers. The mobile telephone battery 100 of FIG. 1 is illustrated as comprising a single flat-sheet layered element 102. The element 102 has an anode layer 104, a cathode layer 106, a separator sheet between them and a further outer separator sheet may curl around the end of the positive sheet at the innermost section of the jellyroll so as to completely isolate the anode layer 104 from the cathode layer 106.

After rolling the element 102 in a spiral manner, the resulting shape is normally cylindrical or ellipsoidal. The rolled element 102 may then be packaged in a casing 108, combined with connections (not shown) to the outside world. Electronic numbering (not shown), typically encoded on a special chip, may be included for identification purposes. The mobile telephone battery 100 depicted in FIG. 1 may be a standalone power supply, or it may be used in cooperation with other elements, as described below.

Due to the internal currents in the battery cell, an external magnetic field may be generated with a magnitude proportional to the magnitude of the current being drained from the battery. Generally speaking, when a battery is in use (e.g., being used to power a mobile phone) and currents are flowing from the battery, a magnetic field is generated. In one case, the magnitude of the current drain varies based on the operation of the mobile telephone. If, for instance, the mobile telephone is operating according to the GSM standard, the magnitude of the current, and, consequently, of the magnetic field generated by the battery 100, will fluctuate with a frequency of 217 Hz and harmonics of 217 Hz. There may be a magnetic field with one polarity on a first side 110 of the battery 100 and a magnetic field of similar magnitude and opposite polarity on a second side 112 of the battery 100, where the second side 112 is the opposite side of the battery 100 relative to the first side 110. The orientations of the north and south poles shown in FIG. 1 (and in subsequent figures) are arbitrary. The actual orientations of the poles may be in any direction.

In overview, a battery is manufactured of a plurality of elements. The plurality of elements are arranged to spiral in opposite directions so that individual magnetic fields generated by each element combine to generate a total magnetic field that is reduced compared to the total magnetic field generated by a single-element battery. Also, the wiring should be arranged in a symmetrical manner to reduce magnetic fields emitted based on currents carried by the wiring.

Figure 2:
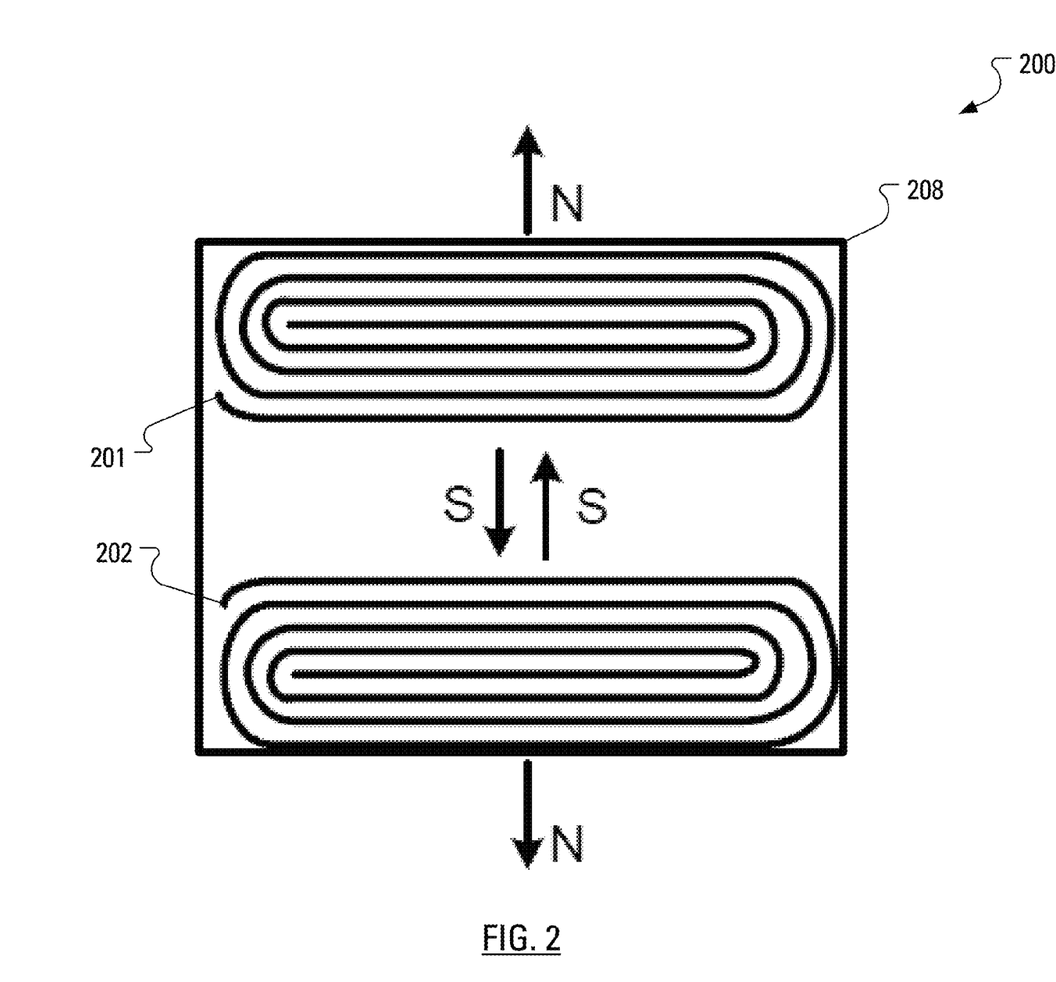
FIG. 2 illustrates a battery using two elements, in cross-section, according to an embodiment of the present disclosure.

FIG. 2 illustrates, in cross-section, a battery 200 using a first element 201 and a second element 202 enclosed in a casing 208. The elements 201, 202 of the battery 200 are arranged such that the first element 201, which spirals in a counter-clockwise direction from the outside to the inside, is placed on top of the second element 202, which spirals in a clockwise direction from the outside to the inside.

In use, the first element 201 generates a first magnetic field. Similarly, in use, the second element 202 generates a second magnetic field. The first element 201 and the second element 202 may be arranged, as shown in FIG. 2, within the casing 208 so that the first magnetic field is proximate to the second magnetic field and oriented in an opposite polarity. Conveniently, it may be shown that the total magnetic field generated by the battery 200 of FIG. 2 is significantly reduced in magnitude relative to the total magnetic field generated by the battery 100 of FIG. 1, for the same current drain. The current drain would be substantially divided in half between the elements 201 and 202, so the generated electromagnetic fields would be substantially equal in magnitude, but opposite in orientation.

To obtain a capacity and physical size similar to the battery 100 of FIG. 1, the elements 201, 202 of the battery 200 of FIG. 2 may have a length that is half of the length of the element 102 of the battery 100 of FIG. 1.

Figure 3:
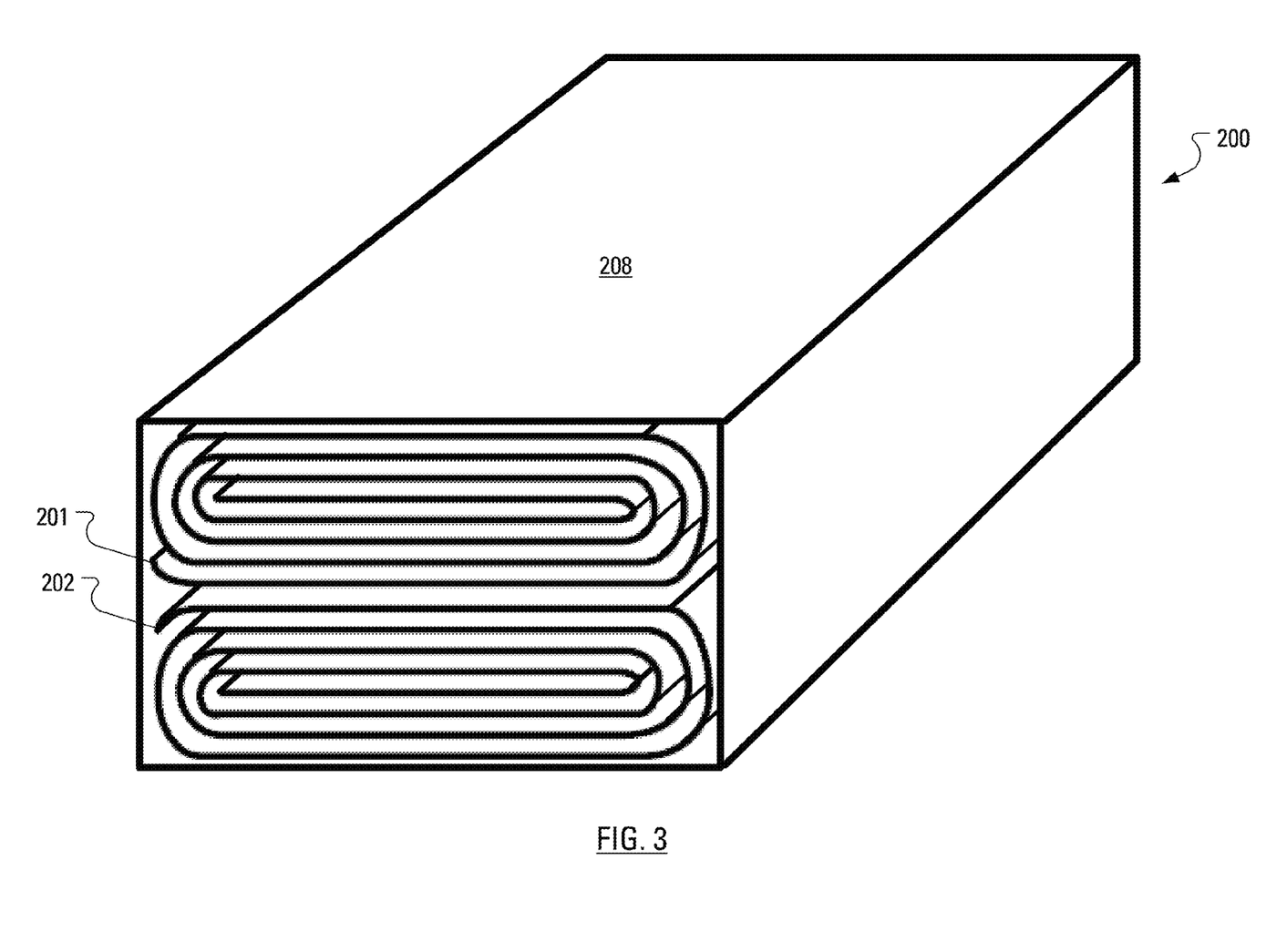
FIG. 3 illustrates, in perspective view, the battery of FIG. 2 with an open end.

FIG. 3 illustrates, in perspective view, the battery 200 of FIG. 2 with the casing 208 having an open end. The dimensions and shape of the casing 208 are arbitrary.

Figure 4A:
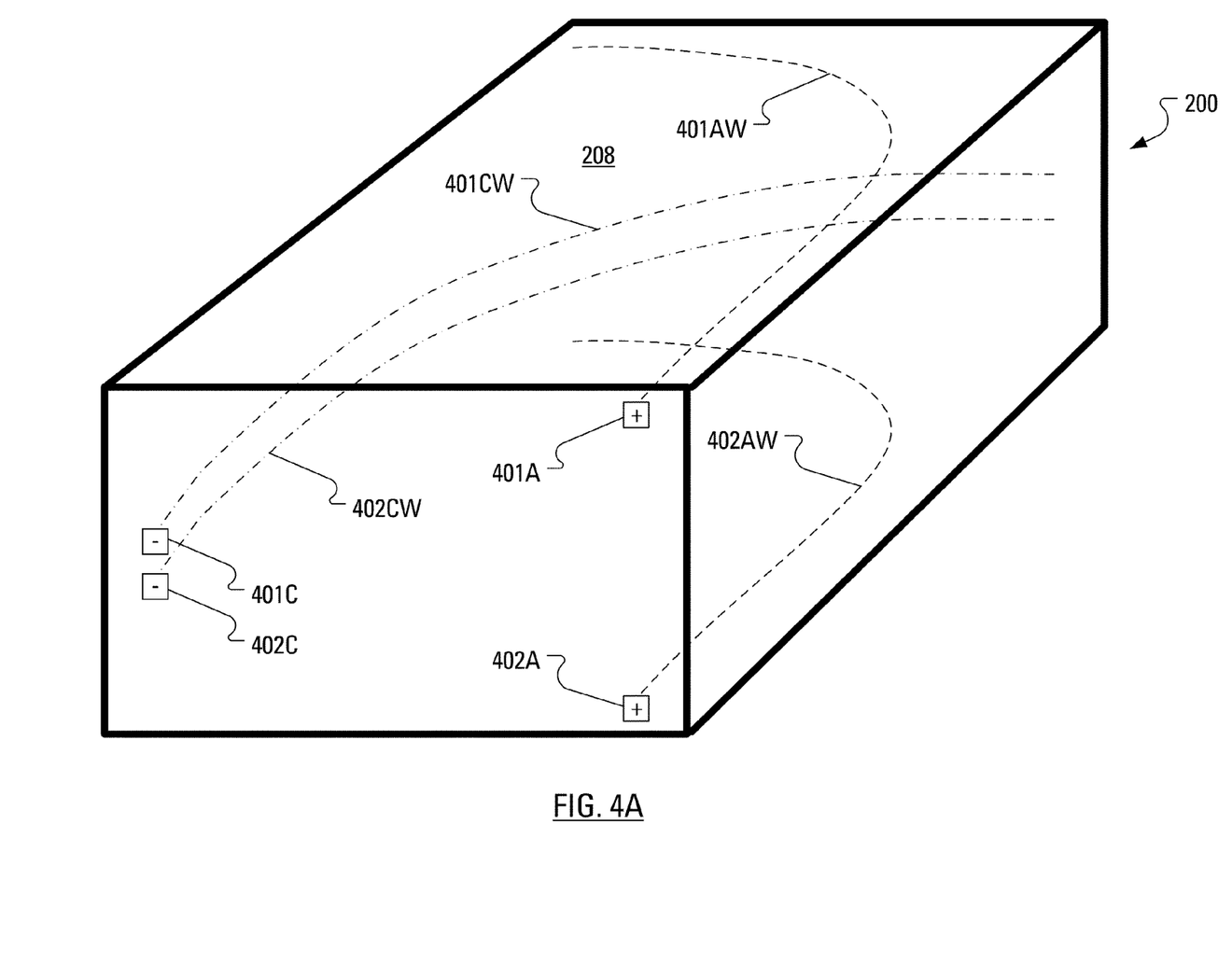
FIG. 4A illustrates, in perspective view, a first variation of the battery of FIG. 2 with a closed end.
Figure 4B:
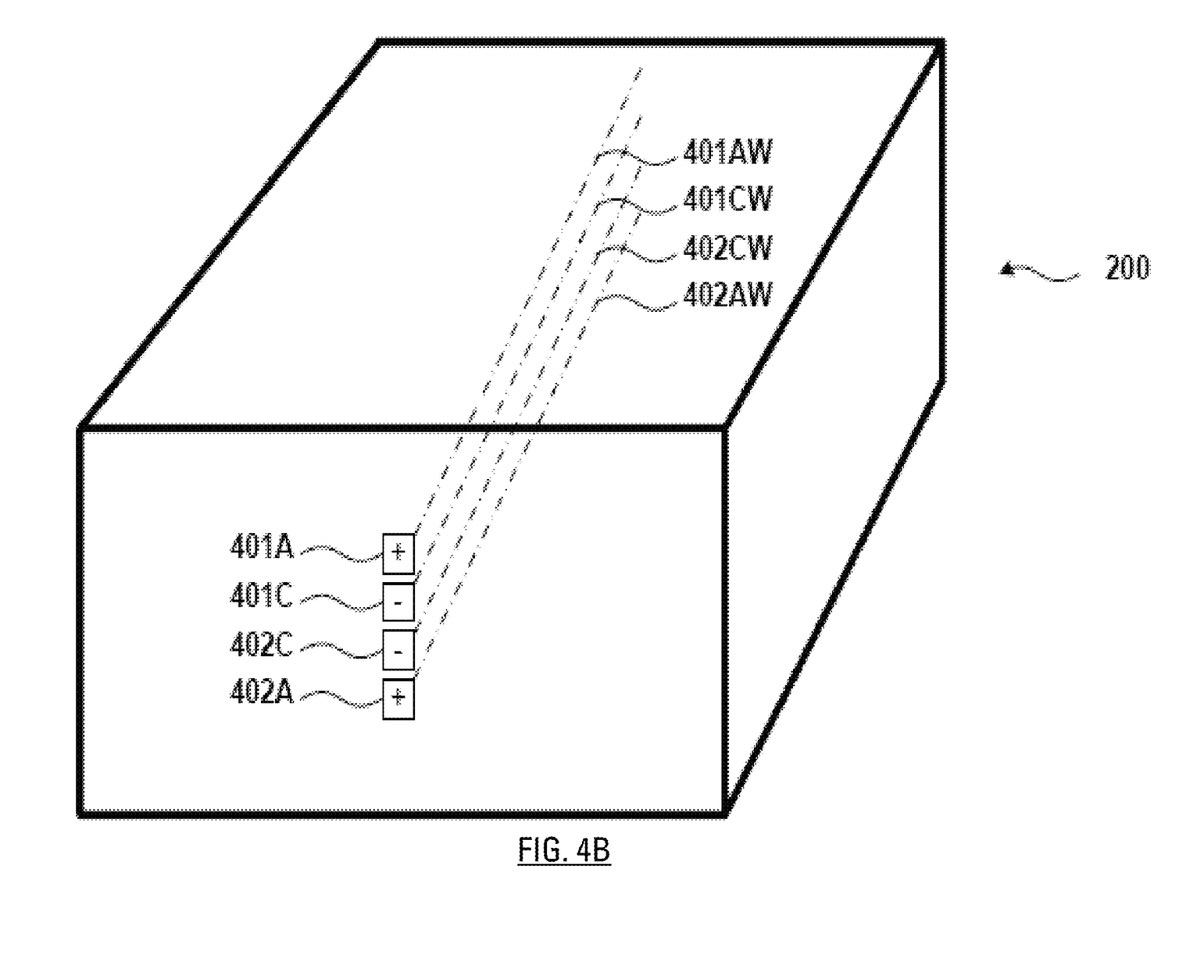
FIG. 4B illustrates, in perspective view, a second variation of the battery of FIG. 2 with a closed end.
Figure 4C:
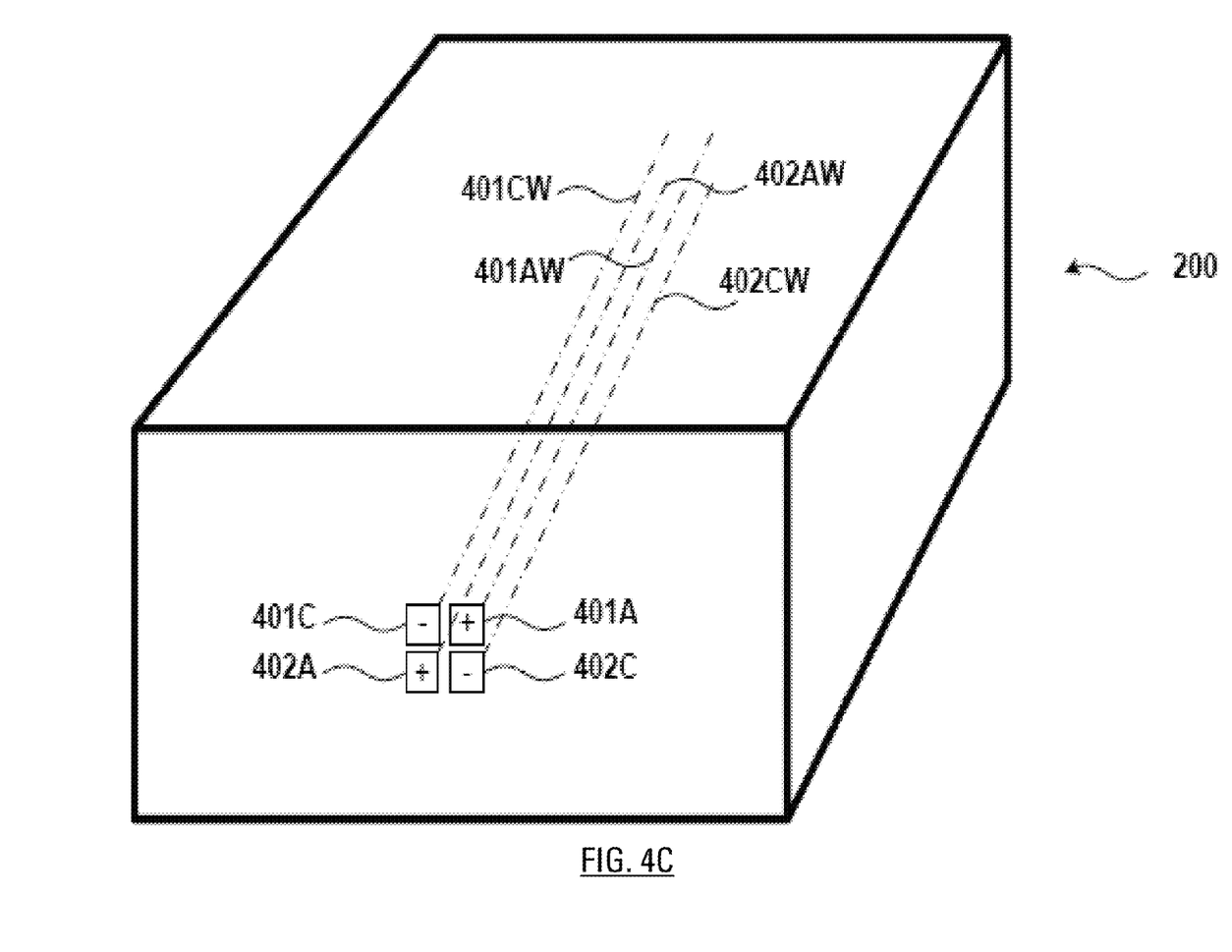
FIG. 4C illustrates, in perspective view, a third variation of the battery of FIG. 2 with a closed end.

FIGS. 4A-4C illustrate, in perspective view, the battery 200 of FIGS. 2 and 3 with the casing 208 having a closed end. As is typical, the closed end of the battery 200 has an anode 401A and a cathode 401C. However, since the battery 200 incorporates two elements 201, 202, the closed end of the battery 200 also has a second anode 402A and a second cathode 402C. The first anode 401A and the first cathode 401C are associated with the first element 201. To electrically connect the first element 201 to the first anode 401A, an anode wire 401AW is provided. Similarly, to connect the first element 201 to the first cathode 401C, a cathode wire 401CW is provided. Correspondingly, the second anode 402A and the second cathode 402C are connected to the second element 202 by a second anode wire 402AW and a second cathode wire 402CW, respectively. In FIGS. 4A-4C, illustration of the elements 201, 202 have been omitted to simplify the drawing.

In keeping with the effort of the present disclosure to reduce a magnetic field generated by current flowing in the battery 200, it is proposed herein to arrange a location of the first anode wire 401AW to be symmetrical, through a transverse plane separating the elements 201, 202, with a location of the second anode wire 402AW, as illustrated in FIGS. 4A-4C. Similarly, it is proposed herein to arrange a location of the first cathode wire 401CW to be symmetrical, through the same plane, with a location of the second cathode wire 402CW, as illustrated in FIGS. 4A-4C. Such symmetrical placement of wires in the multi-element battery 200 may be shown to further assist reduction of the generated magnetic field.

In general, FIG. 4A provides a generic depiction, with anodes, cathodes and wires in an arbitrary deployment. FIG. 4B provides a depiction of the anodes, cathodes and wires in a linear deployment. As depicted in FIG. 4B, anodes 401A and 402A surround cathodes 401C and 402C, with cathodes 401C and 402C proximate to one another. Anodes or cathodes are electrically isolated from one another by insulation. Although they may be proximate to one another, they may, but need not, be physically abutting. FIG. 4C provides a further depiction of the anodes, cathodes and wires in which the anodes 401A and 402A are deployed at two opposing corners of a square and cathodes 401C and 402C are deployed at the other opposing corners of the square. In general, the linear deployment depicted in FIG. 4B reduces the field along the line formed by the anodes and cathodes. The square deployment depicted in FIG. 4C, by contrast, can effectively reduce the field in multiple dimensions.

Other deployments of anodes, cathodes and wires are possible as well. In one variation, a linear deployment may be horizontal, in contrast to the vertical deployment shown in FIG. 4B. In another variation, a linear deployment may include anode 402A and cathode 402C surrounding cathode 401C and anode 401A, in an anode-cathode-anode-cathode configuration. Other configurations are possible as well, and the concepts described herein are not limited to any particular configuration or deployment.

Figure 5:
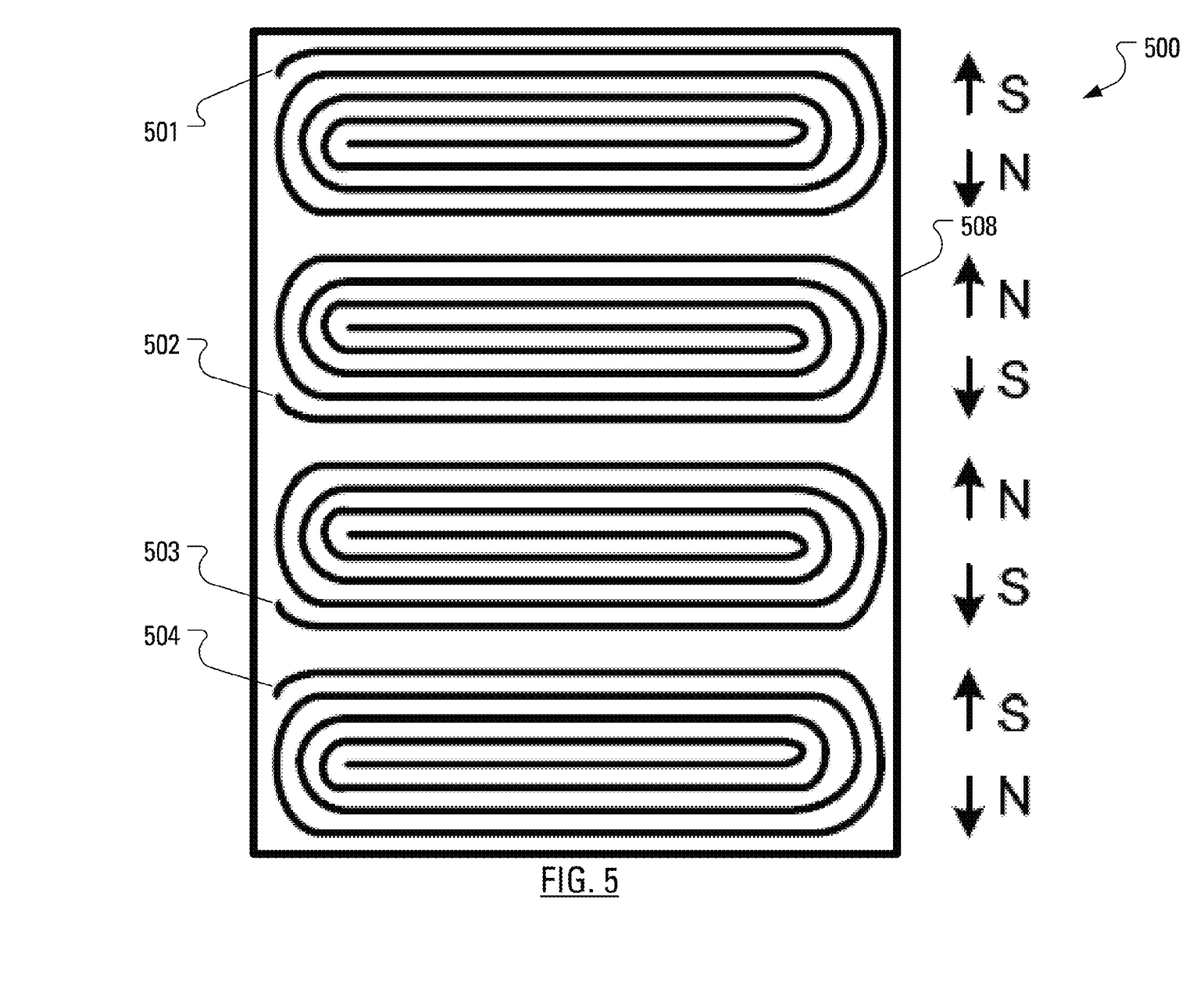
FIG. 5 illustrates a battery using four elements, in cross-section, according to an embodiment of the present disclosure.

FIG. 5 illustrates, in cross-section, a battery 500 using four elements inside a casing 508. The four elements include a first element 501, a second element 502, a third element 503 and a fourth element 504. FIG. 5 illustrates that the elements may be arranged in multiple alternating layers.

Conveniently, it may be shown that the total magnetic field generated by the battery 500 of FIG. 5 is significantly reduced in magnitude relative to the total magnetic field generated by the battery 100 of FIG. 1, for the same current drain. Additionally, it may be shown that the total magnetic field generated by the battery 500 of FIG. 5 is reduced in magnitude relative to the total magnetic field generated by the battery 200 of FIG. 2, for the same current drain.

In one particular configuration, the elements may be arranged so that a centre of magnetism (similar to a centre of gravity) is arranged to occur in the middle of the stack of elements. Such a configuration may be accomplished, with four elements, by arranging the four elements 501, 502, 503, 504 such that the respective bottom poles (as illustrated in FIG. 5) of the elements have the order: north-south-south-north. That is: the south pole of the first element is adjacent the top of the casing 508 of the battery 500; the north pole of the second element 502 is adjacent the north pole of the first element 501; the north pole of the third element 503 is adjacent the south pole of the second element 502; the south pole of the fourth element 504 is adjacent the south pole of the third element 501; and the north pole of the fourth element 504 is adjacent the bottom of the casing 508 of the battery 500.

Similarly, the respective top poles of the elements may be arranged have the order: south-north-north-south. As before, the orientation of the poles in FIG. 5 is arbitrary, but FIG. 5 illustrates a basic configuration of elements with opposing polarities.

To obtain a capacity and physical size similar to the battery 100 of FIG. 1, the elements 501, 502, 503, 504 of the battery 500 of FIG. 5 may have a length that is one quarter of the length of the element 102 of the battery 100 of FIG. 1.

Figure 6:
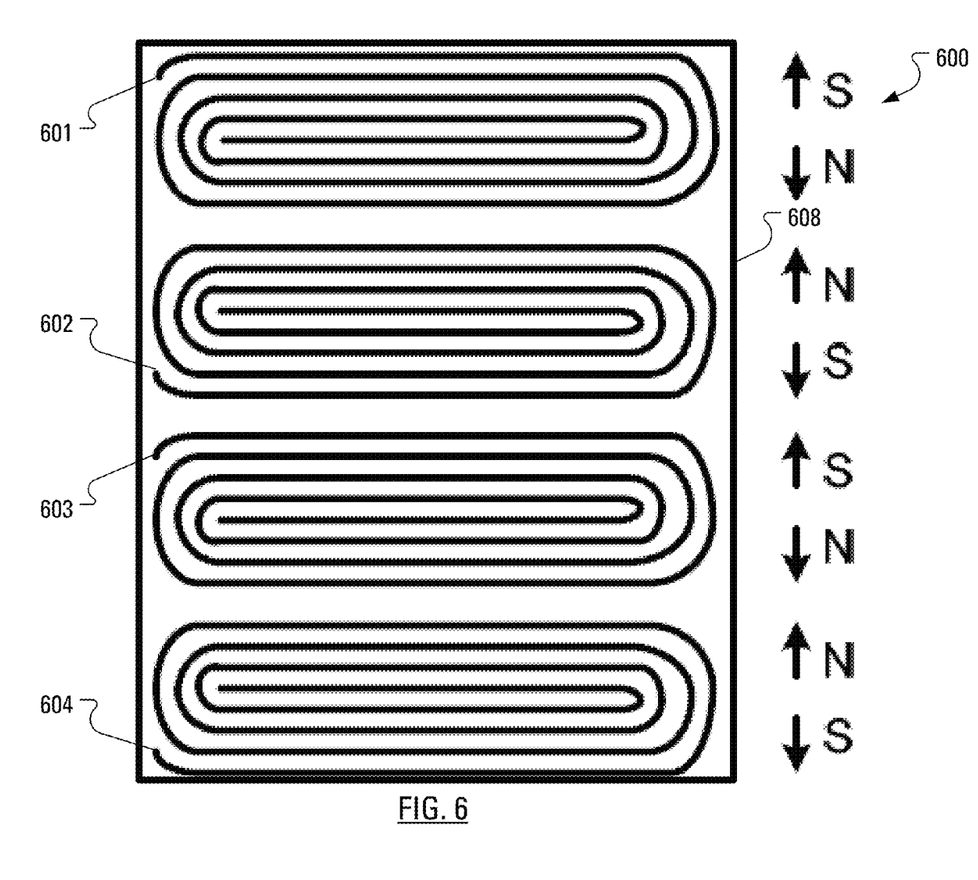
FIG. 6 illustrates a battery using four elements, in cross-section, in a configuration distinct from the configuration of the structure illustrated in FIG. 3, according to an embodiment of the present disclosure.

FIG. 6 illustrates, in cross-section, a battery 600 using four elements inside a casing 608. The four elements include a first element 601, a second element 602, a third element 603 and a fourth element 604. This configuration may have the potential advantage of taking somewhat into account the thickness of the batteries for a further reduction of the magnetic fields from the elements and the wiring. FIG. 6 illustrates that the elements may be arranged in multiple alternating layers.

Distinct from the battery 500 of FIG. 5, the respective poles of the elements 601, 602, 603, 604 of the battery 600 of FIG. 6 may be arranged have the order: south-north-north-south-south-north-north-south. This configuration has the advantage that the batteries are inverted every time for symmetry. As in FIG. 5, the lengths of the elements may be any lengths, such as one quarter of the length of the element 102 of the battery 100 of FIG. 1.

Figure 7:
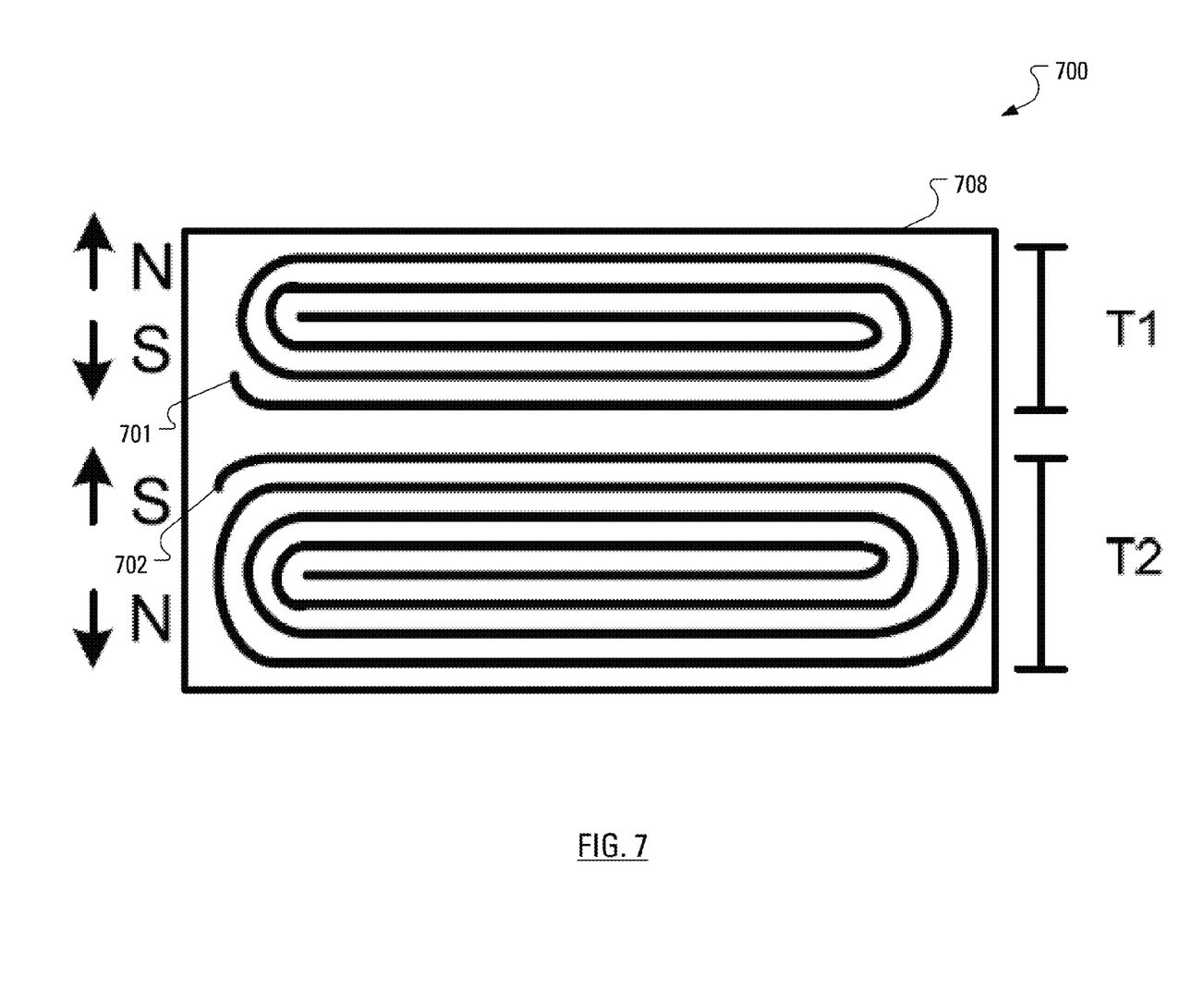
FIG. 7 illustrates a battery using two elements, in cross-section, the two elements having distinct thickness according to an embodiment of the present disclosure.

FIG. 7 illustrates, in cross-section, a battery 700 using two elements inside a casing 708. The two elements include a first element 701 and a second element 702. The thickness (referenced as T1 in FIG. 7) of the first element 701 is less than the thickness (referenced as T1 in FIG. 7) of the second element 702.

The arrangement in FIG. 7 is designed to reduce the generated magnetic field in a specific direction. Even though two elements of opposite magnetic direction will reduce the emitted magnetic field relative to the single element battery 100 of FIG. 1, the use of elements 801, 802 of different thicknesses may reduce the emitted magnetic field even further. The magnetic field generated by the first element 801 will, to some extent, counteract the magnetic field generated by the second element 802, thus reducing the magnetic field generated by the second element 802 and, therefore, it is expected that the cancellation will not be perfect. By choosing different thickness of the elements, the field may be reduced in one preferred direction, normally chosen to be the direction outward from the thinner element. This idea may be extended to the use of more than two cells with different thicknesses. Thicknesses can be selected by experimentation or by modeling techniques that mathematically superimpose the estimated magnetic fields generated by the respective elements.

To simplify manufacturing and decrease any magnetic leak emitted at the end of the battery with terminals attached, it is furthermore suggested to use a symmetric pattern of terminals. Conveniently, in a symmetric pattern of terminals, crossing wires are not needed. The wires will cross, if three wires or more are not used, since the positive and negative terminals will be located at opposite sides of the elements, when the battery is turned upside down and the wiring arrangement is maintained to be as symmetrical as possible.

This can be done using a three terminal wiring pattern, with the pattern of the polarity of the terminals being: negative; positive; negative. Alternatively, the pattern of the polarity of the terminals may be: positive; negative; positive. Accordingly, the wiring is straight down across all elements, without dependence on the number of elements in the battery.

Figure 8:
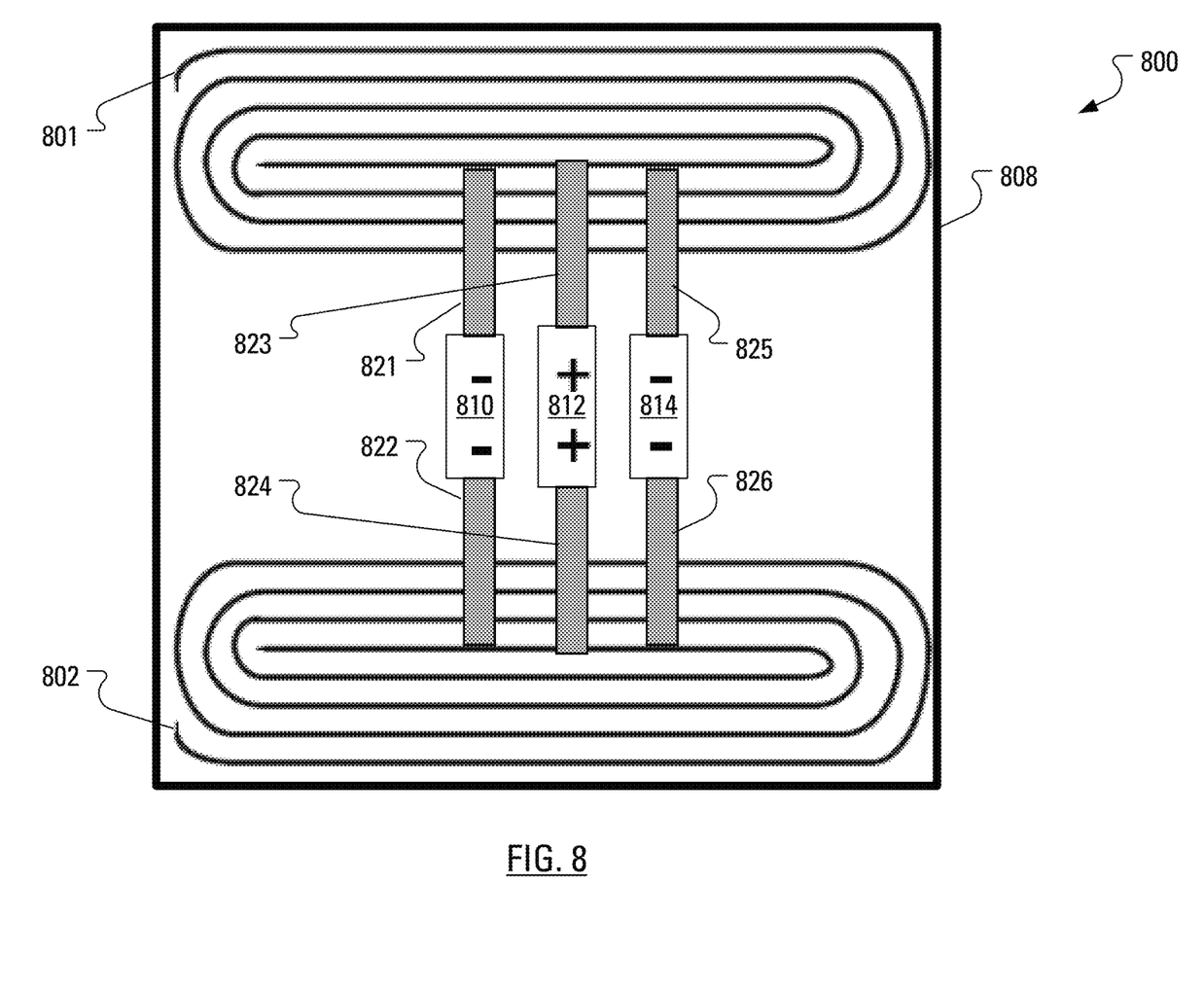
FIG. 8 illustrates a battery using two elements, in cross-section, including a manner in which to attach terminals to the battery, according to an embodiment of the present disclosure.

FIG. 8 illustrates, in cross-section, a battery 800 using two elements inside a casing 808. The two elements include a first element 801 and a second element 802. The battery 800 also includes three terminals: a first cathode terminal 810; an anode terminal 812; and a second cathode terminal 814. FIG. 8 illustrates a manner in which to attach the terminals 810, 812, 814 to the elements 801, 802. In particular, a first cathode terminal conductor 821 connects the first cathode terminal 810 to the cathode layer of the first element 801. A second cathode terminal conductor 822 connects the first cathode terminal 810 to the cathode layer of the second element 802. A first anode terminal conductor 823 connects the anode terminal 812 to the anode layer of the first element 801. A second anode terminal conductor 824 connects the anode terminal 812 to anode layer of the second element 802. A third cathode terminal conductor 825 connects the second cathode terminal 814 to the cathode layer of the first element. A fourth cathode terminal conductor 826 connects the second cathode terminal 814 to the cathode layer of the second element 802. The result is a three terminal wiring pattern, with the pattern of the polarity of the terminals being: negative; positive; negative.

In another embodiment of this idea, the battery is situated inside a casing. The casing includes metallic plates (not shown) for external connection and an identification chip (not shown). The identification chip allows the mobile telephone manufacturer to include hardware and software allowing a mobile telephone processor to determine, through communication with the identification chip, whether the battery has been manufactured by a manufacturer familiar to the mobile telephone processor. That is, the identity of a battery manufacturer may be determined from the information received by the mobile telephone processor from the identification chip. The mobile telephone processor may attempt to locate the identity of a battery manufacturer in a list of known battery manufacturers maintained in a memory of the mobile telephone.

In a further embodiment, the identification chip includes an encryption algorithm. Such an encryption algorithm may be considered to render difficult the making of unauthorized copies of the identification chip. Accordingly, batteries that imitate a form and function of batteries produced by a known manufacturer may fail to be recognized by a mobile telephone processor due to a lack of authentic identification chip.

In yet another embodiment, a battery with elements and wiring arranged to reduce magnetic field leakage, as described above may be combined with a casing that incorporates a magnetic shield. Such a magnetic casing may be formed of a material such as mu-metal. Such a magnetic casing may be shown to further decrease the emitted magnetic field.

Mu-metal is a nickel-iron alloy (approximately 75% nickel, 15% iron, plus copper and molybdenum) that has very high magnetic permeability. The high permeability makes mu-metal very effective at screening static or low-frequency magnetic fields, which cannot be attenuated by other methods. The name came from the Greek letter mu ($\mu$) which represents permeability.

Figure 9:
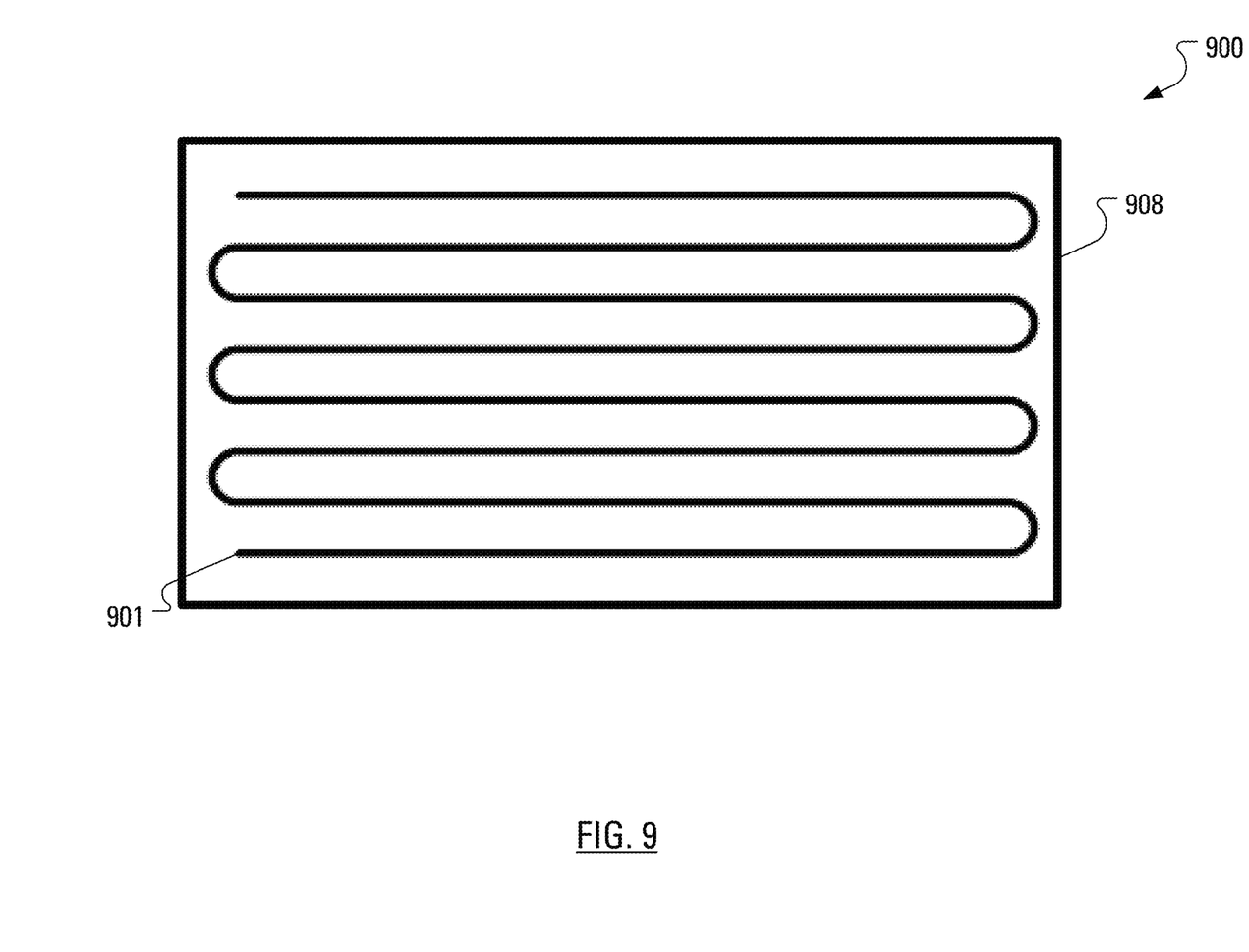
FIG. 9 illustrates a battery, in cross-section, using a single element arranged to minimize magnetic leak, according to an embodiment of the present disclosure.

FIG. 9 illustrates a battery, in cross-section, using a single element arranged to reduce magnetic leak, according to an embodiment of the present disclosure.

FIG. 9 illustrates, in cross-section, a battery 900 using a single element 901 contained inside a casing 908. FIG. 9 illustrates that the element 901 may be manufactured in a manner distinct from the elements discussed hereinbefore, which elements are rolled in a spiral. In the battery 900 of FIG. 9, the single element 901 is folded in alternate ways left and right. Like the rolled elements described above, the single element 901 includes a cathode layer and an anode layer. Unlike a rolled element, however, folds in the folded element cause sites on the anode layer to be proximate to other sites on the anode layer. Similarly, folding causes sites on the cathode layer to be proximate to other sites on the cathode layer. The sites of the respective anode and cathode layers may, but need not, physically abut (typically the layers are insulated so that current would not take a short path because of the folding). Conveniently, the folded structure may be shown to result in a reduced magnetic field relative to rolled elements. In addition, the wiring can be made symmetric so that the magnetic fields generated by current in an anode wire and current in a cathode wire have similar magnitude and opposite polarity. Magnetic fields created by currents passing through the anode and cathode wires would tend to cancel one another.

By including novel batteries, as described herein with reduced magnetic leak, inside a mobile telephone, the quality of audio experienced by a hearing aid user may be shown to be increased relative to a conventional mobile telephone with conventional rechargeable batteries. Furthermore, the background noise level may be shown to be diminished, relative to a conventional mobile telephone, for the normal user.

A further potential benefit associated with the concepts described here in may be greater ease in compliance with local regulations or standards, whether voluntary or mandatory. For example, the United States Federal Communication Commission (FCC) has recognized a standard developed by American National Standards Institute and known as "ANSI C63.19". The ANSI C63.19 standard describes compatibility of a mobile telephone with a hearing aid. The techniques described herein may be helpful toward meeting or exceeding such standards.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A battery comprising:
   a first rolled element including a first anode layer and a first cathode layer, said first element generating, in use, a first magnetic field;
   a second rolled element including a second anode layer and a second cathode layer, said second element generating, in use, a second magnetic field;
   a casing;
   said first rolled element and said second rolled element arranged within said casing so that said first magnetic field is proximate to said second magnetic field and oriented in an opposite polarity;
   a first anode terminal on said casing;
   a first anode wire connecting said first anode terminal to said first anode layer;
   a first cathode terminal on said casing;
   a first cathode wire connecting said first cathode terminal to said first cathode layer;
   a second anode terminal on said casing;
   a second anode wire connecting said second anode terminal to said second anode layer, said second anode wire arranged to be symmetrical, through a transverse plane separating said first rolled element and said second rolled element, with said first anode wire;
   a second cathode terminal on said casing; and
   a second cathode wire connecting said second cathode terminal to said second cathode layer, said second cathode wire arranged to be symmetrical, through said transverse plane, with said first cathode wire.

2. The battery of claim 1 wherein said first rolled element has a first thickness and said second rolled element has a second thickness, said second thickness being greater than said first thickness.

3. The battery of claim 1 wherein said first rolled element and said second rolled element are arranged within said casing so that a north magnetic pole of said first magnetic field is adjacent to a north magnetic pole of said second magnetic field.

4. The battery of claim 1 wherein said first rolled element and said second rolled element are arranged within said casing so that a south magnetic pole of said first magnetic field is adjacent to a south magnetic pole of said second magnetic field.

5. The battery of claim 1 wherein said casing further comprises:
   a first cathode terminal;
   a first cathode terminal conductor connecting said first cathode terminal to said first cathode layer;
   a second cathode terminal conductor connecting said first cathode terminal to said second cathode layer;
   an anode terminal;
   a first anode terminal conductor connecting said anode terminal to said first anode layer;
   a second anode terminal conductor connecting said anode terminal to said second anode layer;
   a second cathode terminal;

a third cathode terminal conductor connecting said second cathode terminal to said first cathode layer; and a fourth cathode terminal conductor connecting said second cathode terminal to said second cathode layer.

6. The battery of claim 1 wherein said first magnetic field and said second magnetic field are substantially equal in magnitude.

7. The battery of claim 1 further comprising a third rolled element including a third anode layer and a third cathode layer, said third element generating, in use, a third magnetic field; and a fourth rolled element including a fourth anode layer and a fourth cathode layer, said fourth element generating, in use, a fourth magnetic field;

said third rolled element and said fourth rolled element arranged within said casing so that said third magnetic field is proximate to said fourth magnetic field and oriented in an opposite polarity.

8. The battery of claim 7 wherein said third rolled element and said fourth rolled element are arranged within said casing so that a north magnetic pole of said third magnetic field is adjacent to a north magnetic pole of said fourth magnetic field.

9. The battery of claim 7 wherein said third rolled element and said fourth rolled element are arranged within said casing so that a south magnetic pole of said third magnetic field is adjacent to a south magnetic pole of said fourth magnetic field.

10. The battery of claim 7 wherein said first rolled element and said second rolled element are arranged within said casing so that a north magnetic pole of said first magnetic field is adjacent to a north magnetic pole of said second magnetic field.

11. The battery of claim 10 wherein said third rolled element and said fourth rolled element are arranged within said casing so that a south magnetic pole of said third magnetic field is adjacent to a south magnetic pole of said fourth magnetic field.

12. The battery of claim 11 wherein said second rolled element and said third rolled element are arranged within said casing so that said south magnetic pole of said second magnetic field is adjacent to said north magnetic pole of said third magnetic field.

13. The battery of claim 10 wherein said third rolled element and said fourth rolled element are arranged within said casing so that a north magnetic pole of said third magnetic field is adjacent to a north magnetic pole of said fourth magnetic field.

14. The battery of claim 13 wherein said second rolled element and said third rolled element are arranged within said casing so that said south magnetic pole of said second magnetic field is adjacent to said south magnetic pole of said third magnetic field.

* * * * *